Figure 1:
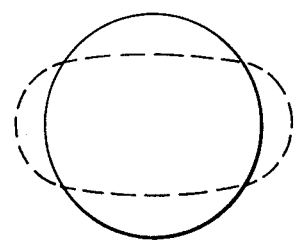

United States Patent [19]

Dyson

[11] 4,380,694
[45] Apr. 19, 1983

[54] LASER CUTTING APPARATUS

[75] Inventor: David J. Dyson, Dundee, Scotland

[73] Assignee: Ferranti Limited, Cheadle, England

[21] Appl. No.: 235,504

[22] Filed: Feb. 18, 1981

[30] Foreign Application Priority Data

Feb. 26, 1980 [GB] United Kingdom ................. 8006423

[51] Int. Cl.³ .............................................. B23K 27/00
[52] U.S. Cl. ....................... 219/121 LG; 219/121 LD;
219/121 LQ
[58] Field of Search ................ 219/121 LG, 121 LN,
219/121 LP, 121 LQ, 121 LR; 350/400;
372/93, 98, 99, 100, 103, 105, 106

[56] References Cited

U.S. PATENT DOCUMENTS

| | | | |
|---|---|---|---|
| 3,388,314 | 6/1968 | Gould | 219/121 L |
| 3,430,158 | 2/1969 | Fox et al. | 372/103 |
| 3,754,195 | 8/1973 | Johnston, Jr. et al. | 372/93 |
| 4,069,458 | 1/1978 | Farcy et al. | 372/106 X |
| 4,116,542 | 9/1978 | Moncar et al. | 219/121 LT X |
| 4,139,263 | 2/1979 | Lehureau et al. | 350/400 |

*Primary Examiner*—C. L. Albritton
*Attorney, Agent, or Firm*—Kerkam, Stowell, Kondracki & Clarke

[57] ABSTRACT

Laser cutting apparatus comprises a laser (20), means (24,25) for directing the output beam of the laser on to a workpiece (26), and means such as a quarter-wave plate (27) for producing circular polarization of the laser output beam. The laser may include within its optical cavity an element which produces stable linear polarization of the output beam. The quarter-wave plate (27) then covers the polarization into circular polarization.

7 Claims, 2 Drawing Figures

LASER CUTTING APPARATUS

This invention is concerned with laser cutting apparatus and particularly, though not exclusively to high-power $CO_2$ lasers used for cutting steel and other metals. Laser cutting apparatus has been in use for some ten years, and has been used for cutting a very wide range of materials including metals, wood, plastic and cloth. A problem sometimes arises when cutting metals, particularly ferrous metals, using lasers operating in the $TEM_{oo}$ mode which provided a very small focal spot. Usually lasers use a stream of gas which is directed at the surface of a workpiece to assist in the cutting action. Even though the laser beam and the gas stream may be perfectly normal to the surface of the material, it has been found that the cut itself is not normal to the surface. This may present serious problems in that pieces cut out of, say, a sheet of material may not fall free even when a cut is completed.

It is an object of the present invention to provide laser cutting apparatus which overcomes the problem described above.

According to the present invention there is provided laser cutting apparatus which includes a laser, means for directing an output beam of the laser on to a workpiece, and control means for producing circular polarization of the laser output beam.

Preferably the laser includes within its optical cavity an element which produces stable linear polarization of the output beam, the control means being operable to convert this linear polarization in to circular polarization.

Figure 2:
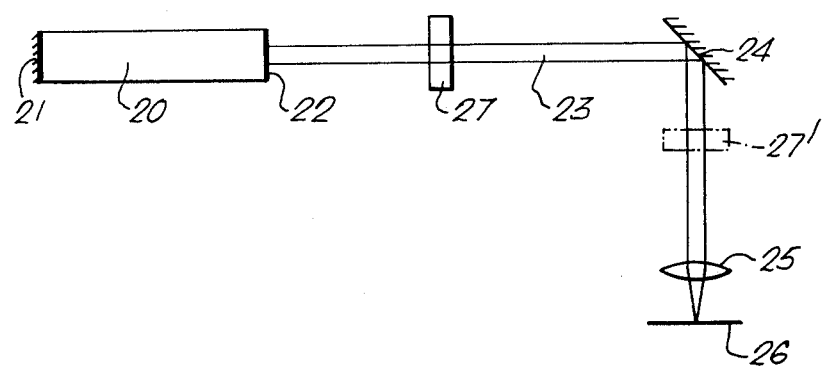

The invention will now be described with reference to the accompanying drawings, in which:

FIG. 1 illustrates the problem associated with prior laser cutting apparatus; and FIG. 2 is a schematic diagram of laser cutting apparatus according to a first embodiment of the invention.

Referring now to FIG. 1, this shows a typical plan view of a nominally circular cut made in a steel plate by a prior art cutting laser. The solid line represents the cut made in the upper surface of the plate, whilst the broken line represents the cut made in the lower surface of the plate. The divergence between the two lines is exaggerated for clarity. What happens is that the cut "leans" at an angle to the normal to the surface, and the angle and direction of "lean" varies around the cut. Hence whilst the cut in the upper surface is circular, that in the lower surface is oval.

I have found that the effect is due to the fact that the output of the usual cutting laser is linearly polarised, and the axis of the electric field is fixed relative to the cutting apparatus. It therefore follows that the direction of the field varies relative to the direction of the cut if a non-linear cut is made. The relationship between the direction of the field and the direction of cut determines the angle and direction of "lean" referred to above.

The problem may be solved by ensuring that the direction of the electric field rotates at a speed which is high relative to the rate of cut of the laser. The simplest way of achieving this is to ensure that the laser output beam is circular polarized. This produces an output beam in which the electric field rotates at a speed related to the frequency of the radiation of the beam.

Circular polarisation is produced by placing in the laser output beam an optical element commonly known as a "quarter-wave plate". This is a plate of a suitable birefringent material such as cadmium sulphide in the case of a $10.6\mu$ $CO_2$ laser output beam. The quarter-wave plate may be placed in the output beam at any desired position, preferably between the laser and the final focussing lens. FIG. 2 is a schematic diagram of the basic elements of a common form of laser cutting apparatus.

Referring now to FIG. 2, the apparatus includes a laser 20, preferably of the carbon dioxide-helium-nitrogen type, having a totally reflecting mirror 21 at one end and a partially-transmitting mirror 22 at the other end. The necessary gas supplies and power supplies are not shown. In operation, a substantially parallel beam of radiation 23 emerges from the laser and is reflected by a mirror 24 to a focussing lens 25. The lens brings the beam of radiation to a focus at the surface of a workpiece 26. Either the laser, the optical system or the focal point of the beam may be moved to any required point on the workpiece.

The quarter-wave plate may be located anywhere in the parallel beam of radiation from the laser. It may, for example, be located between the laser and the mirror 24, as denoted by the reference 27. Alternatively, it may be located between the mirror 24 and the lens 25, as indicated by the reference 27'.

The quarter-wave plate may be located in the focussed part of the beam, but is then more liable to damage due to the beam power. The quarter-wave plate may conveniently be made of cadmium sulphide, though other materials may be suitable, depending upon the wavelength of the radiation emitted by the laser.

The quarter-wave plate 27 of FIG. 2 may be used as the output mirror 22 of the laser 20. This would involve forming the mirror from a birefringent material of the appropriate thickness to act as the quarter-wave plate, whilst at the same time coating one surface of the plate to produce the required degree of reflection. It might also be possible to use the lens 25 as the quarter-wave plate.

It is also possible to use a quarter-wave mirror, for example, in the position of the mirror 24. A quarter-wave mirror is produced by suitably coating a reflecting surface to produce the combined effect of a quarter-wave plate and a mirror.

The arrangement described above will be satisfactory if the laser does not introduce varying polarization of the laser output beam. However, this does occur in practice, and the effect of the quarter-wave plate may be variable in such circumstances. In order to ensure that stable circular polarization is produced by the quarter-wave plate it is advisable to ensure that the laser itself produces a linearly-polarized output. This involves including within the optical cavity a suitable polarizing element. At some wavelengths, such as 1.06, a conventional polarizer such as a Nicol prism could be used. However, at a more usual wavelength of $10.6\mu$ this is not possible. However, other optical elements are available. For example, a Brewster angle window may be placed inside the optical cavity. If the laser is folded, then one of the folding mirrors or prisms may be used as a polarizer. The desired effect may be obtained by forming suitable coatings on the optical elements referred to above. The quarter-wave plate must be correctly aligned with respect to the plane of linear polarization.

What I claim is:

1. Laser cutting apparatus for cutting a workpiece along a predetermined line comprising a laser producing a continuous output beam while in operation, means for producing circular polarization of the laser output beam, and means for directing the circularly polarized laser output beam onto the workpiece whereby a cut of uniform section is produced in the workpiece in any direction of cut.

2. Apparatus as claimed in claim 1 in which the laser includes within its optical cavity an element which produces stable linear polarisation of the output beam.

3. Apparatus as claimed in claim 2 in which the element comprises a Brewster-angle window.

4. Apparatus as claimed in claim 2 in which laser has a folded optical cavity having reflecting folding means, the element comprising one of said folding means.

5. Apparatus as claimed in claim 1 in which the control means comprise a quarter-wave plate a birefringent material located in the laser output beam.

6. Apparatus as claimed in claim 5 in which a coated quater-wave plate forms the output mirror of the laser.

7. Apparatus as claimed in claim 1 in which the means for producing circular polarization comprise a quarter-wave plate mirror located in the laser output beam.

* * * * *